United States Patent
Katingari (10) Patent No.: US 10,599,823 B2
(45) Date of Patent: Mar. 24, 2020

(54) SYSTEMS AND METHODS FOR COORDINATING APPLICATIONS WITH A USER INTERFACE

(71) Applicant: InvenSense, Inc., San Jose, CA (US)

(72) Inventor: Karthik Katingari, Milpitas, CA (US)

(73) Assignee: InvenSense, Inc., San Jose, CA (US)

( * ) Notice: Subject to any disclaimer, the term of this patent is extended or adjusted under 35 U.S.C. 154(b) by 205 days.

(21) Appl. No.: 15/355,407

(22) Filed: Nov. 18, 2016

(65) Prior Publication Data

US 2018/0144111 A1 May 24, 2018

(51) Int. Cl.
| | | |
|---|---|---|
| *G06F 21/32* | (2013.01) | |
| *H04L 29/06* | (2006.01) | |
| *G06F 21/30* | (2013.01) | |
| *H04W 12/06* | (2009.01) | |
| *G06F 3/041* | (2006.01) | |
| *G06F 3/0488* | (2013.01) | |
| *G06K 9/00* | (2006.01) | |

(52) U.S. Cl.
CPC ............ *G06F 21/32* (2013.01); *G06F 3/0416* (2013.01); *G06F 3/0488* (2013.01); *G06F 21/30* (2013.01); *G06K 9/00013* (2013.01); *H04L 63/08* (2013.01); *H04W 12/06* (2013.01)

(58) Field of Classification Search
CPC ...... G06F 21/32; G06F 3/0416; G06F 3/0488; G06F 21/30; G06K 9/00013; H04L 63/08; H04W 12/06
USPC .......................................................... 726/24
See application file for complete search history.

(56) References Cited

U.S. PATENT DOCUMENTS

| | | | | |
|---|---|---|---|---|
| 9,678,571 B1* | 6/2017 | Robert | ............... | G06F 3/016 |
| 2010/0225607 A1* | 9/2010 | Kim | ............... | G06F 3/167 |
| | | | | 704/235 |
| 2012/0092277 A1* | 4/2012 | Momchilov | ............ | G06F 3/038 |
| | | | | 345/173 |
| 2015/0074615 A1* | 3/2015 | Han | ................... | G06K 9/00033 |
| | | | | 715/863 |
| 2015/0135108 A1* | 5/2015 | Pope | .................. | G06K 9/00006 |
| | | | | 715/767 |
| 2015/0143275 A1* | 5/2015 | Yi | | |
| 2015/0347010 A1* | 12/2015 | Yang | ...................... | H04L 67/025 |
| | | | | 715/765 |
| 2016/0062464 A1* | 3/2016 | Moussette | ................ | G08B 6/00 |
| | | | | 345/173 |
| 2016/0154956 A1* | 6/2016 | Fadell | ................... | G06F 21/316 |
| | | | | 726/19 |
| 2016/0180184 A1* | 6/2016 | Vieta | .................... | G06K 9/3208 |
| | | | | 382/124 |
| 2017/0046024 A1* | 2/2017 | Dascola | ............ | H04M 1/72522 |
| 2017/0255771 A1* | 9/2017 | Miyakawa | .............. | G06F 3/042 |
| | | | | 345/173 |
| 2017/0359722 A1* | 12/2017 | Folse | ...................... | G06F 21/10 |
| 2018/0114010 A1* | 4/2018 | Van Os | ................... | G06F 21/32 |

(Continued)

*Primary Examiner* — Khalil Naghdali (74) *Attorney, Agent, or Firm* — Bay Area Technology Law Group PC (57) ABSTRACT

Systems and methods are disclosed for coordinating applications by detecting a touch input and a related touch input a device locations associated with the applications, one of which is a user authentication application. A parameter may be established with the user authentication application so that the other application runs with the at least one parameter.

18 Claims, 8 Drawing Sheets

(56) References Cited

U.S. PATENT DOCUMENTS

2018/0203986 A1\* 7/2018 Huang et al. ........... G06F 21/30
345/173

\* cited by examiner

SYSTEMS AND METHODS FOR COORDINATING APPLICATIONS WITH A USER INTERFACE

FIELD OF THE PRESENT DISCLOSURE

This disclosure generally relates to techniques for coordinating applications using a touch interface and more particularly to establishing an authentication parameter to be used when running one of the applications.

BACKGROUND

An important criterion used when designing a user interface is the ease with which a user may interact with a computing device to control its operation. In many applications, such as smartphones and laptops, attempts have been made to provide a touch-based interface that is responsive to one or more points of contact with the user, such as through a fingertip. Touch-based implementations may offer benefits in comparison to more traditional techniques for providing user input, such as through a mouse or keyboard. In a parallel development, there is an increasing need to provide techniques for identifying or otherwise authenticating a user to enhance security when running applications that may access sensitive information, such as banking or private communications. Typically, the user must perform a two-stage operation to coordinate an application requiring user verification with the authentication application providing that verification. For example, launching an application that requires identity verification may result in a prompt for the user to provide the necessary authentication. Depending on the computing device being used, this may involve fingerprint recognition or another suitable technique. Correspondingly, the user then provides the appropriate input to complete the identity verification. As the number of applications employing user identification proliferate, this sequence of operations may be required sufficiently often to present a usability burden. Accordingly, it would be desirable to coordinate an application with user authentication when using a touch-based interface. As will be described in the following materials, this disclosure satisfies these and other needs.

SUMMARY

As will be described in detail below, this disclosure includes a method for coordinating at least two applications. The method may involve detecting a touch input at a device location associated with a first application, monitoring for a related touch input ending at a device location associated with the second application, wherein one of the first and second applications is a user authentication application, detecting the related touch input at the device location associated with the second application, establishing at least one parameter with the user authentication application and running one of the first and second applications that is not the user authentication application with the at least one parameter.

This disclosure also includes a user interface for a device having a touch-based input. The interface may detect a touch input at a device location associated with a first application, monitor for a related touch input ending at a device location associated with the second application, wherein one of the first and second applications is a user authentication application, detect the related touch input at the device location associated with the second application, establish at least one parameter with the user authentication application and run one of the first and second applications that is not the user authentication application with the at least one parameter.

Further, the disclosure may include a device for coordinating at least two applications. The device may have a touch screen, a fingerprint sensor and a processor. The processor may be operable to detect a touch input at a device location associated with a first application, monitor for a related touch input ending at a device location associated with the second application, wherein one of the first and second applications is a user authentication application, wherein at least one of the device location associated with the first application and the device location associated with the second application are on the touch screen and wherein at least one of the device location associated with the first application and the device location associated with the second application comprise the fingerprint sensor, detect the related touch input at the device location associated with the second application, establish at least one parameter with the user authentication application and run one of the first and second applications that is not the user authentication application with the at least one parameter

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "evaluating," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a sensor processing unit (SPU) and a microprocessor, a plurality of microprocessors, one or more microprocessors in conjunction with a SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As noted above, it is increasingly desirable to provide a computing device with a touch interface that coordinates applications including a user authentication application. To help illustrate these and other aspects of the disclosure, details regarding one embodiment of a computing device 100 are depicted as high level schematic blocks in FIG. 1. As will be appreciated, device 100 may be implemented as a device or apparatus, such as a handheld, portable electronic device. For example, such a computing device may be a desktop computer, laptop computer, tablet, portable computer, portable phone (e.g., cellular smartphone, a phone running on a local network, or any other telephone handset), wired telephone (e.g., a phone attached by a wire), personal digital assistant (PDA), video game player, video game controller, (head-mounted) virtual or augmented reality device, navigation device, activity or fitness tracker device (e.g., bracelet or clip), smart watch, other wearable device, portable internet device (MID), personal navigation device (PND), digital still camera, digital video camera, binoculars, telephoto lens, portable music, video, or media player, remote control, or other handheld device, or a combination of one or more of these devices.

Figure 1:
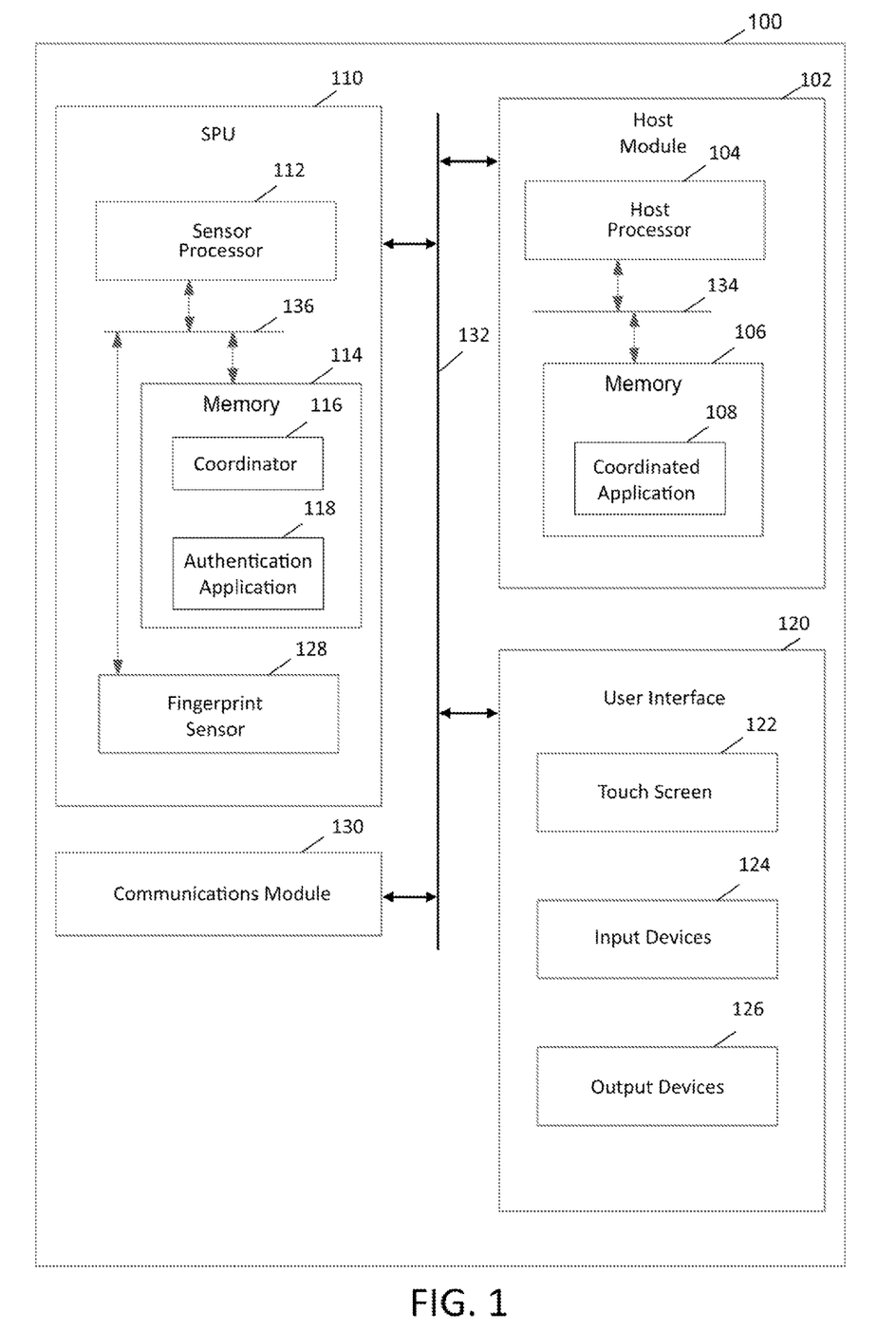
FIG. 1 is a schematic diagram of a device for coordinating applications according to an embodiment.

Device 100 has a host module 102, that generally includes host processor 104 and memory 106. Host processor 104 can be one or more microprocessors, central processing units (CPUs), or other processors which run software programs, which may be stored in memory 106, such as at least one coordinated application 108. Depending on the chosen architecture, device 100 may also have a sensor processing unit (SPU) 110, that generally includes sensor processor 112 and memory 114. Again, sensor processor 112 can be one or more microprocessors, CPUs, or other processors to run software programs, which may be stored in memory 114, such as coordinator 116 that may include instruction for performing the operations described in this disclosure for facilitating interoperation of authentication application 118 and coordinated application 108. Although represented as separate modules, the functionality corresponding to host module 102 and SPU 110 may be implemented using any number of processors and any number and types of memory resources. As will be appreciated, any suitable allocation of operations may be distributed among the resources of device 100. As one example, coordinator 116 may be implemented in memory 106 to be executed by host processor 104. Authentication of the fingerprint may be performed by authentication application 118, which may be stored and run on SPU 110. Alternatively, authentication application 118 may be stored in host module 102 and performed by host processor 104. The authentication application may run in a so-called 'Trusted Execution Environment' (TEE), which represents a secure area of the host or sensor processor, guaranteeing that the code and data are protect with respect to confidentiality and integrity. When the TEE is on host processor 104, the fingerprint detected by fingerprint sensor 128 is transferred to host module 102 for authentication.

Accordingly, multiple layers of software can be provided in memory 106, which may be any combination of computer readable medium such as electronic memory or other storage medium such as hard disk, optical disk, etc., for use with the host processor 104 or with other processing resources as noted. For example, an operating system layer can be provided for device 100 to control and manage system resources in real time, enable functions of application software and other layers, and interface application programs with other software and functions of device 100. As will be described in more detail below, coordinator 116 may function to detect and interpret user input so that one or more coordinated applications 108, which may be any software application programs such as banking software, menu navigation software, games, navigation software, social media software, personal administration software, communications software, such as telephony or wireless local area network (WLAN) software, or others may be run with a parameter established by authentication application 118. Thus, multiple different applications can be provided on a single device 100, and multiple applications can run simultaneously. Any of a wide variety of other software and functional interfaces may also be provided.

Device 100 also has a user interface 120, including touch screen 122 that functions as both an input and output in the context of this disclosure. User interface 120 may include other input devices 124, such as a mouse, microphone, buttons, joystick, slider, keyboard, knob, scanner, or other similar peripherals. Likewise, user interface 120 may also include additional output devices 126, such as speakers, haptic vibration, indicator lights, readouts, secondary screens, or others.

In this embodiment, fingerprint sensor 128 is depicted as being incorporated into SPU 110 but any other suitable architecture may be employed. Fingerprint sensor 128 may detect sufficient characteristics of a user's fingerprint to provide a desired degree of confidence in recognizing and matching the detected fingerprint to a stored reference to identify the user. In some embodiments, fingerprint sensor 128 may be positioned adjacent touch screen 122 on the same surface of device 100 or may be positioned on a different surface, such as an opposing surface. In other embodiments, fingerprint sensor 128 may be integrated into touch screen 122 itself, using any suitable technology. Although only one fingerprint sensor is shown in FIG. 1, more than one fingerprint sensor may be integrated in device 100. These fingerprint sensors maybe on different surfaces, or may be on the same surface, for example two or more fingerprint sensor positioned at different position below the (touch)screen. The fingerprint sensor may also be incorporated in a button, such as e.g. the 'home' button on many smartphones. Fingerprint sensor 128 may be based on any suitable technology, such as e.g. capacitive fingerprint sensors, or sensors based on ultrasound technologies. Exemplary implementations of fingerprint sensors based on ultrasound technology are disclosed in found in co-pending, commonly owned U.S. patent application Ser. No. 15/266, 673, which is hereby incorporated by reference in its entirety. This disclosure includes a method of operating a two-dimensional array of ultrasonic transducers, in which a plurality of array positions comprising pluralities of ultrasonic transducers of the two-dimensional array of ultrasonic transducers is defined, the plurality of array positions each comprising a portion of ultrasonic transducers of the two dimensional array of ultrasonic transducers. For each array position of the plurality of array positions, a plurality of ultrasonic transducers associated with the respective array position are activated. The activation includes transmitting ultrasonic signals from a first group of ultrasonic transducers of the plurality of ultrasonic transducers, wherein at least some ultrasonic transducers of the first group of ultrasonic transducers are phase delayed with respect to other ultrasonic transducers of the first group of ultrasonic transducers, the first group of ultrasonic transducers for forming a focused ultrasonic beam. The activation also includes receiving reflected ultrasonic signals at a second group of ultrasonic transducers of the plurality of ultrasonic transducers. Further examples are disclosed in found in co-pending, commonly owned U.S. patent application Ser. No. 15/354,876 (IVS-684), which is hereby incorporated by reference in its entirety. This disclosure includes a method for operating a fingerprint sensor comprising a plurality of ultrasonic transducers, in which a first subset of ultrasonic transducers of the fingerprint sensor are activated, the first subset of ultrasonic transducers for detecting interaction between an object and the fingerprint sensor. Subsequent to detecting interaction between an object and the fingerprint sensor, a second subset of ultrasonic transducers of the fingerprint sensor are activated, the second subset of ultrasonic transducers for determining whether the object is a human finger, wherein the second subset of ultrasonic transducers comprises a greater number of ultrasonic transducers than the first subset of ultrasonic transducers. As desired, one or more regions of touch screen 122 may be configured to function as fingerprint sensor 128 or the entire touch screen may be used.

Alternatively, embodiments may not employ anything that functions as a fingerprint sensor, but authentication application 118 may establish the at least one parameter, such as verifying or determining the user's identity, in other suitable manners, such as through voice or facial recognition, through input of a password or personal identification number (PIN), entry of a code gesture, or the like. Any combination of input devices 124 and/or touch screen 122 may be used for identity verification depending on the implementation.

In some embodiments, device 100 may also have communications module 130, employing any suitable wired or wireless communication protocol. For example, wireless protocols including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™), BLUETOOTH®, ZigBee®, ANT, near field communication (NFC), infrared (IR) and the like may be used in an embodiment.

As shown in FIG. 1, host module 102, SPU 110, user interface 120 and communications module 130 may be interconnected through bus 132, while host processor 104 and memory 106 are coupled through bus 134 and sensor processor 112, fingerprint sensor 128, and memory 114 are coupled through bus 136. Buses 132, 134 and 136 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired.

Figure 2:
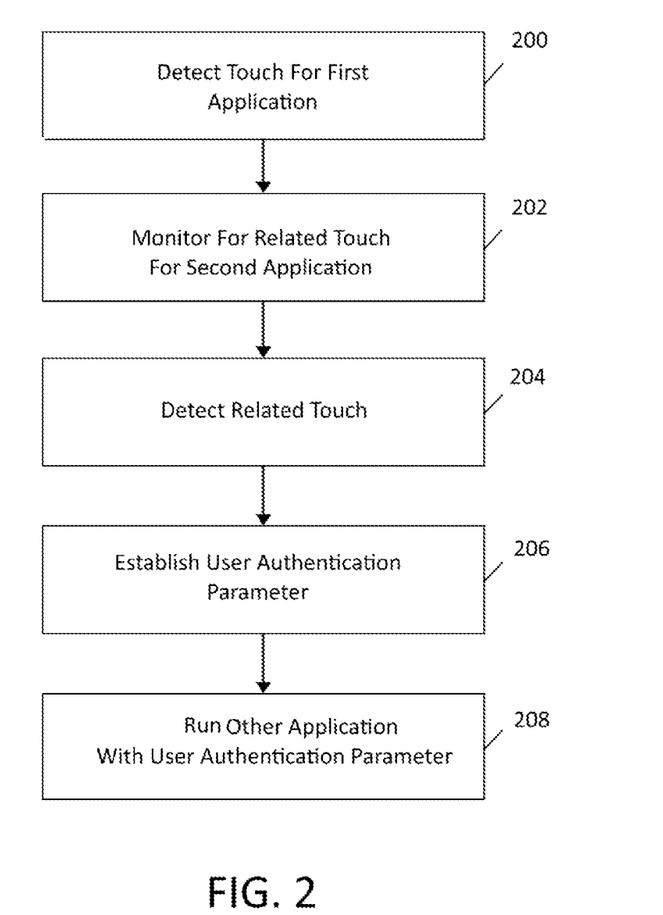
FIG. 2 is a flowchart showing a routine for coordinating applications according to an embodiment.

Thus, in the context of device 100, one suitable implementation of the techniques of this disclosure is represented by the flow chart depicted in FIG. 2. Beginning with 200, coordinator 116 may detect a user input at a location on device 100 associated with a first application, which may be authentication application 118 or may be coordinated application 108 depending on the embodiment. Detection of the user input may be via touch screen 122, and the location may be designated by an icon or the like as desired. Alternatively, detection of the user input may occur at a location other than on touch screen 122, such as at fingerprint sensor 128, which as noted may be positioned on a surface adjacent touch screen 122 or may be on a different surface of device 100. In 202, coordinator 116 may monitor for a related touch input ending at a device location associated with a second application, which may be authentication application 118 if the first application is coordinated application 108 or may be coordinated application 108 if the first application is authentication application 118. As will be described in more detail below, the touch input at the location associated with the first application and the related touch input ending at the location associated with the second application may be a gesture, such as a swipe beginning at the first location and ending at the second location, or may be a sequential or simultaneous input at these locations. In 206, authentication application 118, which as noted may either be the first application or the second application, may establish at least one parameter, such as validating an identity of the user. Depending on the embodiment, 206 may occur either after 200 or after 204, depending on which location is associated with authentication application 118. As will be appreciated, such validation may be achieved in any suitable manner, such as through fingerprint sensor 128, through recognition of code pattern, input of a password, facial or voice recognition or others as described above. Correspondingly, coordinator 116 may then run coordinated application 108 with the established parameter.

Figure 3:
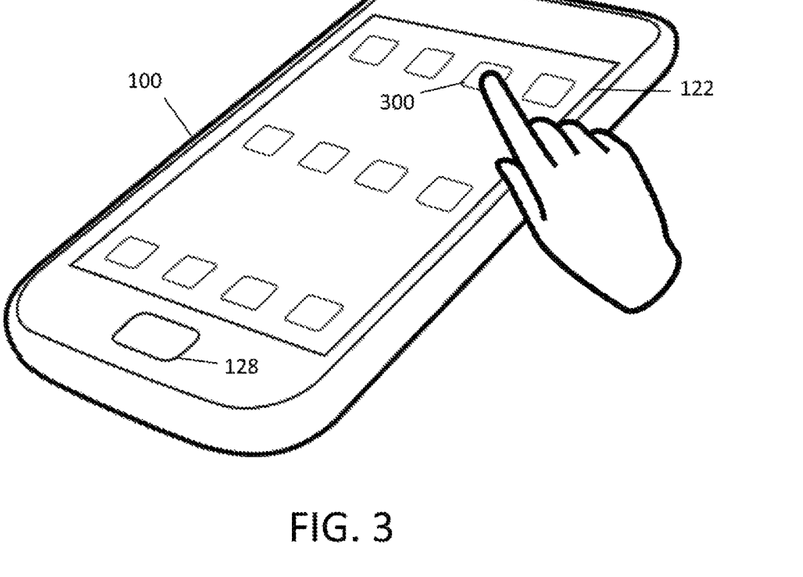
FIGS. 3 and 4 are schematic diagrams depicting a touch input at a coordinated application device location and a related touch input at an authentication application device location according to an embodiment.
Figure 4:
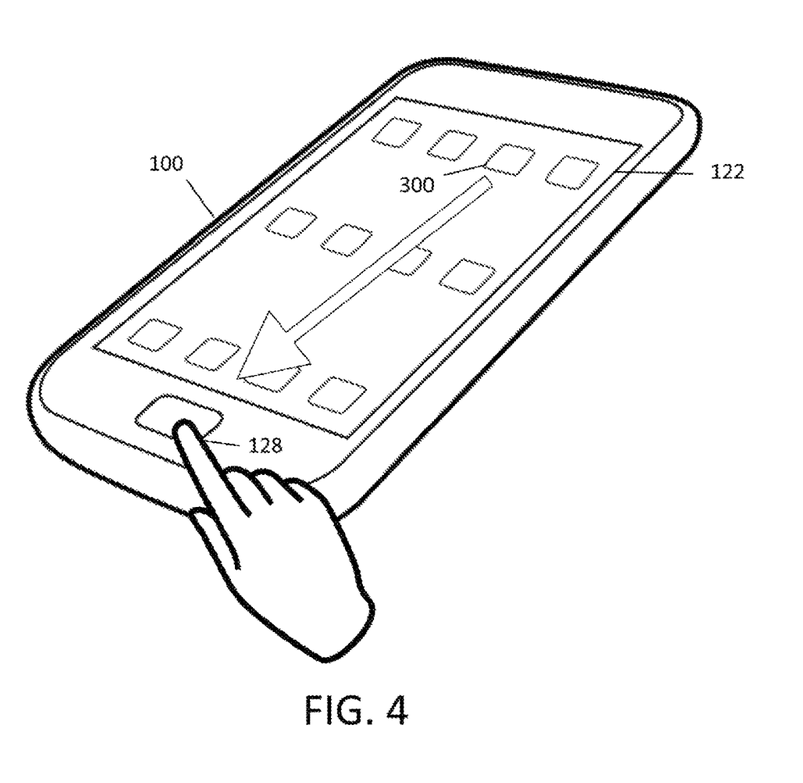

One example of this routine is schematically depicted by the sequence shown in FIGS. 3 and 4. Starting with FIG. 3, a user may provide a touch input at location 300 on touch screen 122 of device 100, which in this example may be associated with coordinated application 108. The user may then swipe to a second location, which in this embodiment is fingerprint sensor 128 and is associated with authentication application 118, thereby providing the related touch input ending at the location associated with the second application. In this embodiment, it is noted that fingerprint sensor 128 is positioned on the same surface of device 100 as touch screen 122. Authentication application 118 may then verify the user's identity, or otherwise establish a parameter that is used when running coordinated application 108. As will be appreciated, these techniques provide a convenient means to the coordinated application 108 with information about the user's identity as a security measure or to customize operation of coordinated application 108 based on the user's identity.

The fingerprint sensor 128 may not be operated continuously, but may also be in a sleep mode, for example to save power resources. The interaction of the user with the coordinated application 108 and/or the swipe of the user across the touchscreen may be used as a trigger to wake up the fingerprint sensor because an authentication is required. Based on the movement of the user, the estimated time for the authentication may be calculated, for example, by analyzing the speed of the swipe and the remaining distance to the sensor. If a calibration of the fingerprint sensor is required, the calibration process may be planned such that when the finger of the user arrives at the sensor position, the sensor is ready for operation. In one aspect, the fingerprint sensor may operate only part of the sensor surface in expectation of the arriving finger. For example, if the sensor comprises row and columns, the top row closest to the touchscreen may be operated only because that is the row where the finger is sensed first. As soon as the top row senses the finger, the rest of the sensor surface may be activated to obtain the complete fingerprint for authentication. The sensor surface that is selectively activated may depend on the position of the sensor compared to the touchscreen, and/or the position of the swipe on the touchscreen. Information of the required authentication after the user swipe may be communicated to the fingerprint sensor by the coordinator 116 (in SPU or the host module) or the communications module 130. The sensor processor, or any other processor, may then take the required steps in preparation for the sensing of the fingerprint and the authentication.

The system or coordinator 116 may start the coordinated application 108 as soon as the user starts the swipe, or after a predefined threshold to avoid accidental launches. The coordinator 116 may analyze if the swipe is in the direction of the fingerprint sensor, because in some situation a swipe in another direction may be related to other functions, for example, a swipe towards the top or trashcan icon may signify a required deletion of the coordinated application 108. The coordinated application 108 may be displayed as soon as possible, or the displaying may be delayed until the authentication is complete. The coordinated application 108 may also be prepared to receive the authentication info or requested authentication parameter. In one aspect, the coordinated application 108 may have two different modes. A first mode may be initiated when the user simple taps the icon related to the application, without making a swipe. In this first mode no authentication is done right away. A second mode may be initiated when the swipe is detected, where the coordinated application 108 is ready to receive the authentication information or data.

The coordinated application 108 may require a certain authentication or authentication parameters, and coordinator 116 may transfer this request to the authentication application and/or the SPU processor. For example, in the use of an ultrasound fingerprint sensor, the sensor may only read the surface fingerprint, or may also look into the deeper layers of the skin, such as e.g. to acquire the deeper/or dermis fingerprint. The fingerprint sensor 128 and authentication application 118 may be configured and/or operated based on the obtained request and may determine the appropriate authentication parameter(s), and an associated confidence of the parameter(s).

Figure 5:
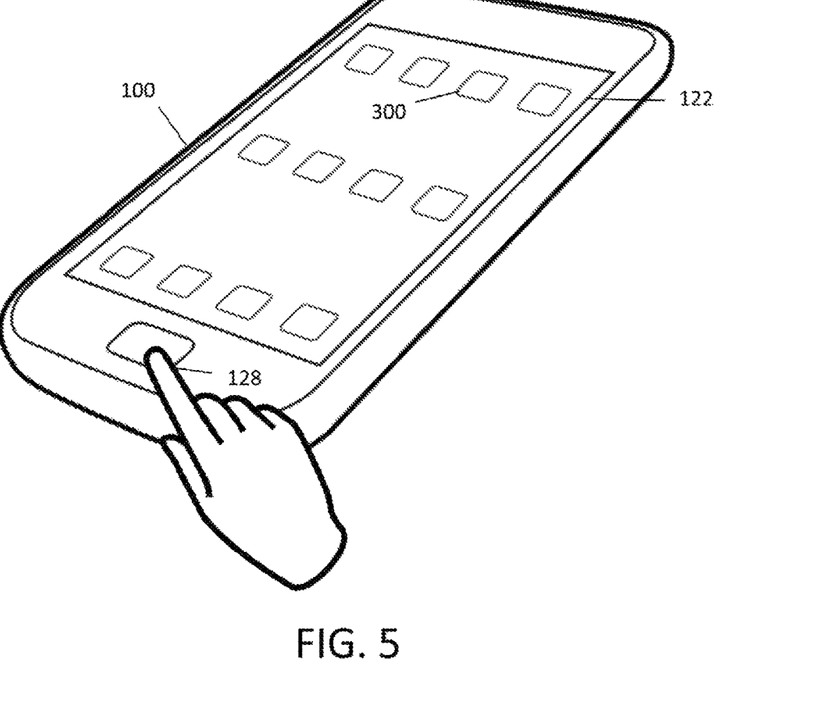
FIGS. 5 and 6 are schematic diagrams depicting a touch input at an authentication application device location and a related touch input at a coordinated application device location according to an embodiment.
Figure 6:
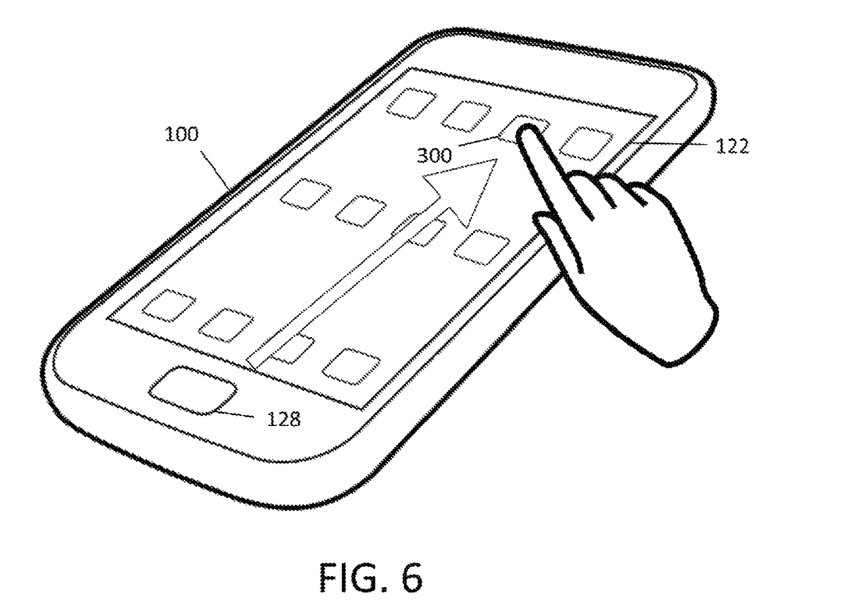

While the above example corresponds to the first application being coordinated application 108 and the second application being authentication application 118, a similar example illustrates these techniques in the opposite context with the sequence shown in FIGS. 5 and 6. Starting with FIG. 5, a user may provide a touch input at fingerprint sensor 128, which is associated with authentication application 118. The user may then swipe to location 300 on touch screen 122 of device 100, which as noted is associated with coordinated application 108. In this example, the touch input and related touch input are provided by the user swiping from fingerprint sensor 128 to location 300 and achieve the same result, conveniently running the coordinated application 108 with information about the user's identity as established by authentication application 118.

In a similar manner to the examples in FIGS. 3 and 4, the swipe information may be used to control the operation of the fingerprint sensor in the example of FIGS. 5 and 6. In this example, the fingerprint sensor may be put in a sleep mode once the authentication is done and the user is swiping the finger across the touchscreen towards the coordinated application 108. Since the authentication application is launched first, the authentication information needs to be stored while waiting for the user the reach the coordinated application 108. In one aspect, the authentication process may be performed completely and then the system waits for the coordinated application to launch, while in another aspect, only the fingerprint may be determined, but the authentication process may only be launched once the coordinated application 108 is reached. For example, the fingerprint data may be send from the SPU to the TEE in the host module and stored there until coordinated application 108 is reached. This may be an advantage in case the authentication process that uses the fingerprint depends on (specific requests from) the coordinated application 108. Furthermore, from a safety stand point, it may not be desired to have the authentication on hold.

When the coordinator detects the start of the swipe, the coordinated application 108 may already be started (in the background) once it can determine with a certain accuracy what the targeted coordinated application is. If there is only one coordinated application 108 on the current page, the choice is obvious. If there is more than one coordinated application 108 on the current page, then the system may analyze the swiping motion and predict the targeted application. This prediction may have a certain accuracy, or accuracy zone, and if more than one coordinated application is within this zone, the launch of the coordinated application 108 needs to be delayed until only one candidate for the coordinated application remains (as the user continues his or her swipe). If the coordinated application is launched or is ready before the user's swipe reached the coordinated application, the displaying of the application may be delayed until the users reaches the application icon. If the wrong coordinated application is started, the process may be aborted without the user being aware.

Together, these examples demonstrate that the timing of when authentication application 118 establishes the parameter may vary as warranted by the circumstances. In the example of FIGS. 3 and 4, establishing the authentication parameter may occur after the related touch input is detected at fingerprint sensor 112, which necessarily occurs after detecting touch input at location 300, while in the example of FIGS. 5 and 6, establishing the authentication parameter may occur at any time after detecting the touch input at fingerprint sensor 112, such as simultaneously while monitoring for the related touch input at location 300 or after detecting the related touch input.

Any of the processes related to starting the coordinated applications or operating the fingerprint sensor, may be stopped or paused when the user lifts his or her finger from the screen. In other words, the swipe must be of a continuous nature in order for the coordinator 116 or any other related process to continue operation. In case the authentication has already take place, any information related to the authentication may be deleted, e.g. to avoid misuse.

Figure 7:
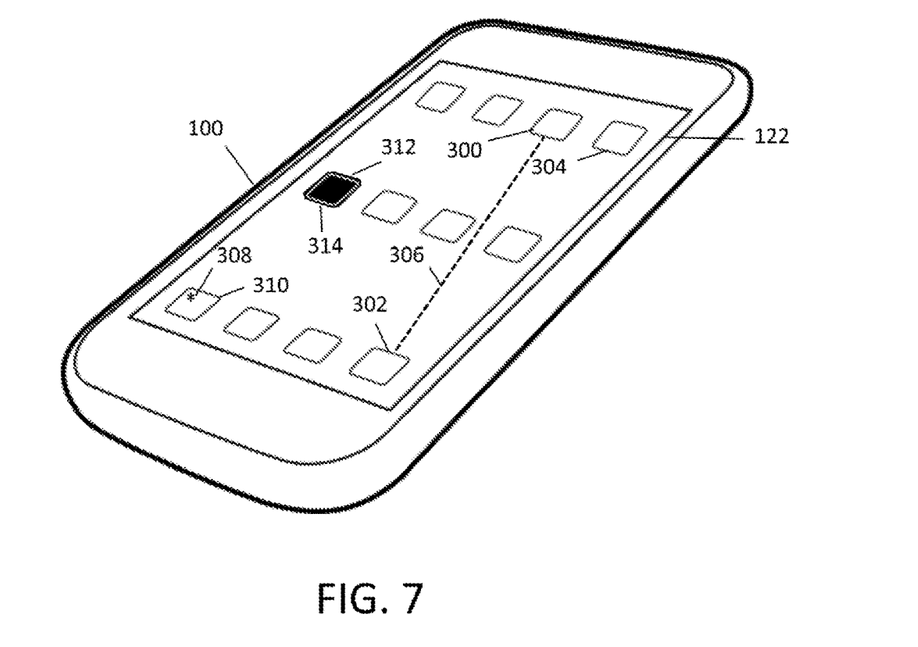
FIG. 7 is a schematic diagram of depicting exemplary visual indications for coordinating applications according to an embodiment.

Other aspects of these techniques are depicted in FIG. 7, which shows an embodiment of device 100 which does not require a dedicated fingerprint sensor outside touch screen 122, but one or more fingerprint sensors may be positioned behind touch screen 122. In these embodiments, the fingerprint sensor 128 may be capable of sensing the fingerprint through the touch screen 122. In some aspects, touch screen 122 may itself employ a suitable technology that allows sensing of a fingerprint for example by combing display technology with sensing technology to register the fingerprint. As such, one or more regions of touch screen 122 may be configured to function as a fingerprint sensor, such as location 302, either directly by the touch screen 122 or by fingerprint sensor 128 mounted behind touch screen 122. The fingerprint sensor may be located in many different positions, which may depend on the hardware architecture or intended use. For example, as shown in FIG. 7, the fingerprint sensor may correspond to location 302, and location 300 may correspond to the location of a coordinated application. The screen at the position of the fingerprint sensor may show authentication application 118, or any other graphical aid to indicate to the user the location of the fingerprint sensor. Alternatively, the screen at the position of the fingerprint sensor may only show authentication application 118 when required, for example, once a user interacts with coordinated application 108. Any other graphics may move out of the way in an animated manner in order to 'make room' for the authentication application. In some embodiments, device 100 may comprise more than one fingerprint sensor, for example in location 302 and location 304. The closest fingerprint location may then be selected and activated depending on the location of the coordinated application. In the example of FIG. 7, this would mean that if location 300 corresponds to the coordinated application, fingerprint sensor location 304 may be activated. When organizing the locations of the different application, the locations of the coordinated applications may be optimized to be near the one or more fingerprint sensor locations, and the optimization may be done by the system, or the system may guide the user. If there are different fingerprint sensors with different capabilities or specifications, the optimization may take this into account. Correspondingly, the combination of detecting a touch input and a related touch input, such as in the form of a swipe, may involve for example swiping from location 300 to location 302 or vice versa, similar to the embodiments as discussed in relation to FIGS. 3-6. In yet other embodiments, the location(s) on device 100 associated with authentication application 118 and/or coordinated application 108 may be variable. In one aspect, the change in location may be configured to guide the user. As an example, location 300 may be associated with coordinated application 108, while location 302 may nominally be configured to function as a fingerprint sensor. However, upon detection of touch input at location 300, another location, such as location 304, may be enabled to function as a fingerprint sensor. Changing the location of the fingerprint sensor to a region adjacent location 300 may facilitate performing the appropriate gesture, such as swiping. As an additional example, the region of touch screen 122 that functions as a fingerprint sensor may be the same, or may be changed to include, the location associated with the coordinated application 108. Accordingly, the related touch input may be provided by "long pressing" at a given location. In other words, a short press would launch coordinated application 108 without authentication, and a long press would launch coordinated application 108 with authentication. As desired, a suitable visual confirmation or other feedback, such as haptic or sound, may be used to confirm proper completion of the gesture.

The user interface may be further adapted as desired, including by using animation to highlight the change in location, which may prompt the user to complete the gesture. As will be appreciated, a wide variety of other user interface features may be adapted to achieve similar results. For example, a path 306 may be displayed on touch screen 122 leading from the location at which the touch input is detected, such as location 300, to the location being monitored of the related touch input, such as location 302. These examples should not be considered limiting and any suitable locations on device 100 may be used. Further, one or more icons displayed on touch screen 122 may be used to represent a relevant location, such as a location associated with authentication application 118 and/or coordinated application 108. Thus, the icon(s) may be used to identify those applications which are coordinated with authentication application 118, such as with indicia 308 at location 310. Further, the icon(s) may be dynamic, changing appearance to signify a particular stage of the operation. For example, FIG. 7 schematically indicates a highlight 312 with respect to location 314, in response to detection of a touch input at location 302, which as noted, may be configured to function as a fingerprint sensor. As such, location 314 may be associated with another coordinated application 108 so that highlight 312 conveys to the user that the appropriate gesture (e.g., a swipe), may terminate at location 314 in order to run that coordinated application with the parameter established by authentication application 118. Alternatively, or in addition, other applications not related to coordinated application 108 and/or authentication application 118, may also be modified, for example, by modifying transparency, intensity or size. Here, as in the remainder of the disclosure, it is to be noted that although examples may be described in the context to the first application being one of authentication application 118 or coordinated application 108, the techniques are equally applicable with suitable modification to the first application being the other of authentication application 118 or coordinated application 108.

Figure 8:
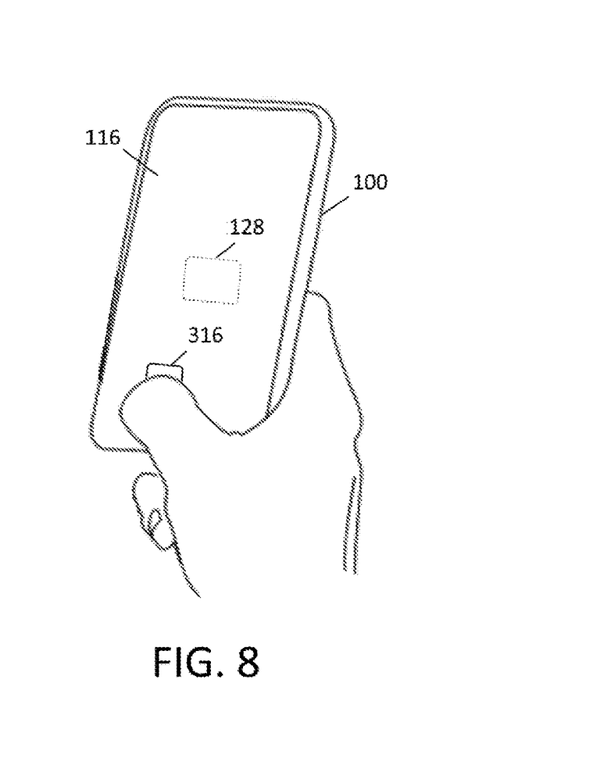
FIG. 8 is a schematic diagram of depicting touch input and related touch input on opposing surfaces of the device according to an embodiment.

Yet another embodiment of device 100 is schematically depicted in FIG. 8. Here, touch screen 122 is on one surface of device 100 and fingerprint sensor 128 (shown in phantom), is positioned on a different surface, such as the opposing surface. Accordingly, a user may provide a touch input at location 316 along with a related touch input at fingerprint sensor 128. For example, the touch inputs may be made simultaneously, as shown with the user providing the touch input at location 316 with a thumb and providing the related touch input at fingerprint sensor 128 with a finger, while holding device 100 in the hand. However, other sequences and combinations of touch inputs may also be employed.

Figure 9:
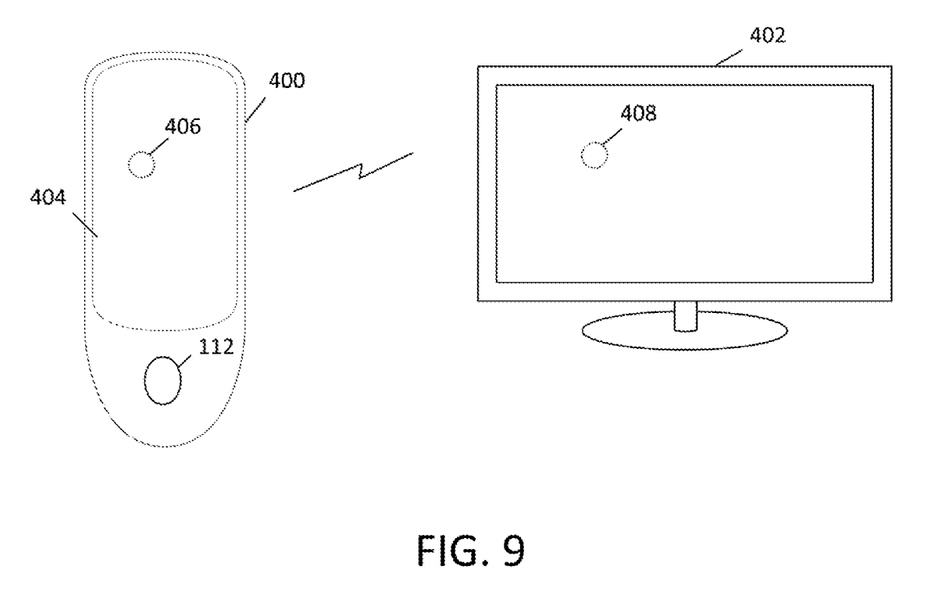
FIG. 9 is a schematic diagram of depicting touch input and a related touch input on a remote device for controlling an external display according to an embodiment.

Further, these techniques may be employed with embodiments in which the touch screen functionality is effectively split between multiple devices, such as in the example depicted in FIG. 9, showing a remote device 400 used for controlling an external display 402, such as a "smart" television or the like. At least one touch surface 404 of remote device 400 accepts touch inputs in a similar manner to the touch inputs described above in the context of touch screen 122. Correspondingly, external display 402 may function as one of the outputs of the user interface, so that icons and menus may be presented and interacted with using remote device 400. As an example only, a virtual representation on external display 402 may be used to signify a contextual position of the user's input on touch surface 404 as a feature of the user interface. Thus, a location 406 on remote device 400 may, at a given time, correspond to a location 408 on external display 402. Since external display 402 may use an icon or any other suitable signifier to associate location 408 with a coordinated application 108, for the purposes of this disclosure, location 406 on remote device 400 may also be associated with the coordinated application. In some embodiments, remote device 400 may also have fingerprint sensor 128 with the characteristics described above to provide user authentication. Alternatively, or in addition, any region, combination or regions, or the entirety of touch surface 404 may be configured to function as a fingerprint sensor.

As will be appreciated, techniques similar to those described above may easily be employed with remote device 400. As one illustration only, a touch input may be detected at location 406, which as noted may be considered as being associated with a first application, such as coordinated application 108, based at least in part on the feedback provided by external display 402. The user may then provide a related touch input at the location of fingerprint sensor 112, such as by terminating a swipe gesture at that location, which in turn is associated with a second application, authentication application 118. In embodiments where one or more regions of touch surface 404 are configured to function as fingerprint sensors, the touch input and related touch input may occur at two locations on touch surface 404, and the sequence from first to second application may be either authentication application 118 to coordinated application 108 or coordinated application 108 to authentication application 118 as discussed above. The fingerprint sensor 112 may be incorporated in touch surface 404, the authentication application may be shown on external display 402 to guide the user to the fingerprint sensor 112 without showing the authentication application on remote device 400.

In some embodiments, the touch input and related touch input may operate to provide an enhanced level of security. As noted above, the related touch input may end at the location associated with the second application, such as through a swipe gesture. By confirming that the user's touch was continuous between the touch input and the related touch input, it may be assumed that the same individual whose identity was verified by authentication application 118 is running the coordinated application 108 with the established parameter. In this context, running coordinated application 108 with an authenticated user only occurs when authentication application 118 has contemporaneously verified the user's identity and ensured continuous contact between the verification and the run of the coordinated application, regardless of which occurs first.

Figure 10:
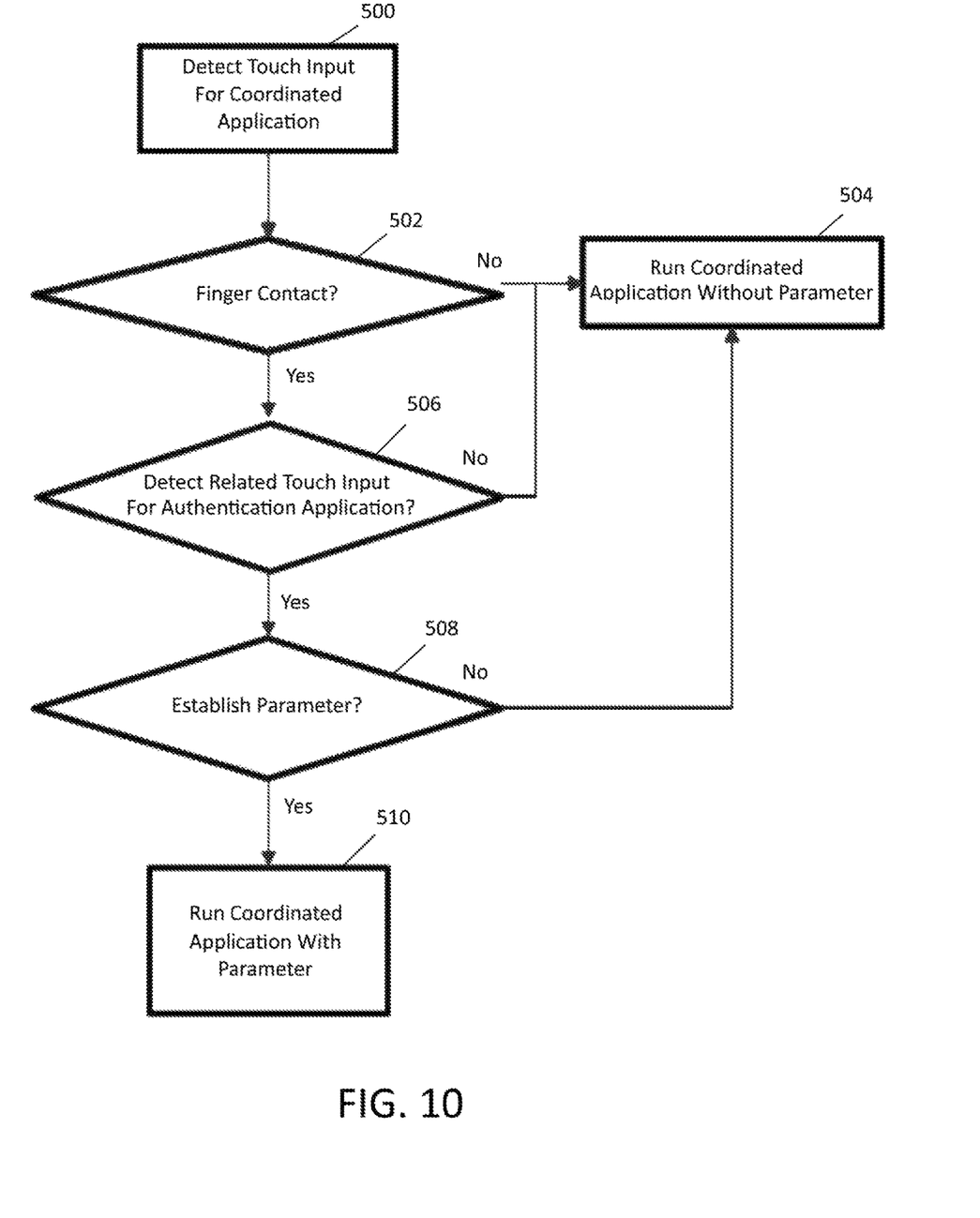
FIG. 10 is a flowchart showing a routine for coordinating applications by providing a touch input at a coordinated application device location according to an embodiment.

An illustrative routine that may be performed when the first application is coordinated application 108 is schematically depicted in FIG. 10. Beginning with 500, a touch input may be detected at a device location associated with a first application, which as noted is coordinated application 108 in this example. In 502, coordinator 116 may determine whether the user's finger has maintained continuous contact with touch screen 122. If not, such as if the finger is lifted before providing the related touch input, the routine may branch to 504 and run the coordinated application 108 without the parameter established by authentication application 118. For example, the application may run in a default, unsecured mode, such as at a user identification and password entry screen. In other embodiments, the coordinated application 108 may be configured not to run at all if the authentication parameter is not established. If finger contact is verified in 502, a related touch input may be detected at the device location associated with the second application, authentication application 118, such as at fingerprint sensor 128 for example. If no related touch input is detected, the routine may again branch to 504, otherwise the routine progresses to 508 and the authentication parameter may be established in if an appropriate match is found. If the authentication parameter is established, coordinated application 108 may be run with the established parameters as indicated in 510. If the authentication parameter was not established, such as if the fingerprint sensor 128 output did not match the reference stored for the user, and the routine may continue to 504 as discussed above. Similarly, if the authentication parameter does not meet preset specifications the routine may continue to 504.

Figure 11:
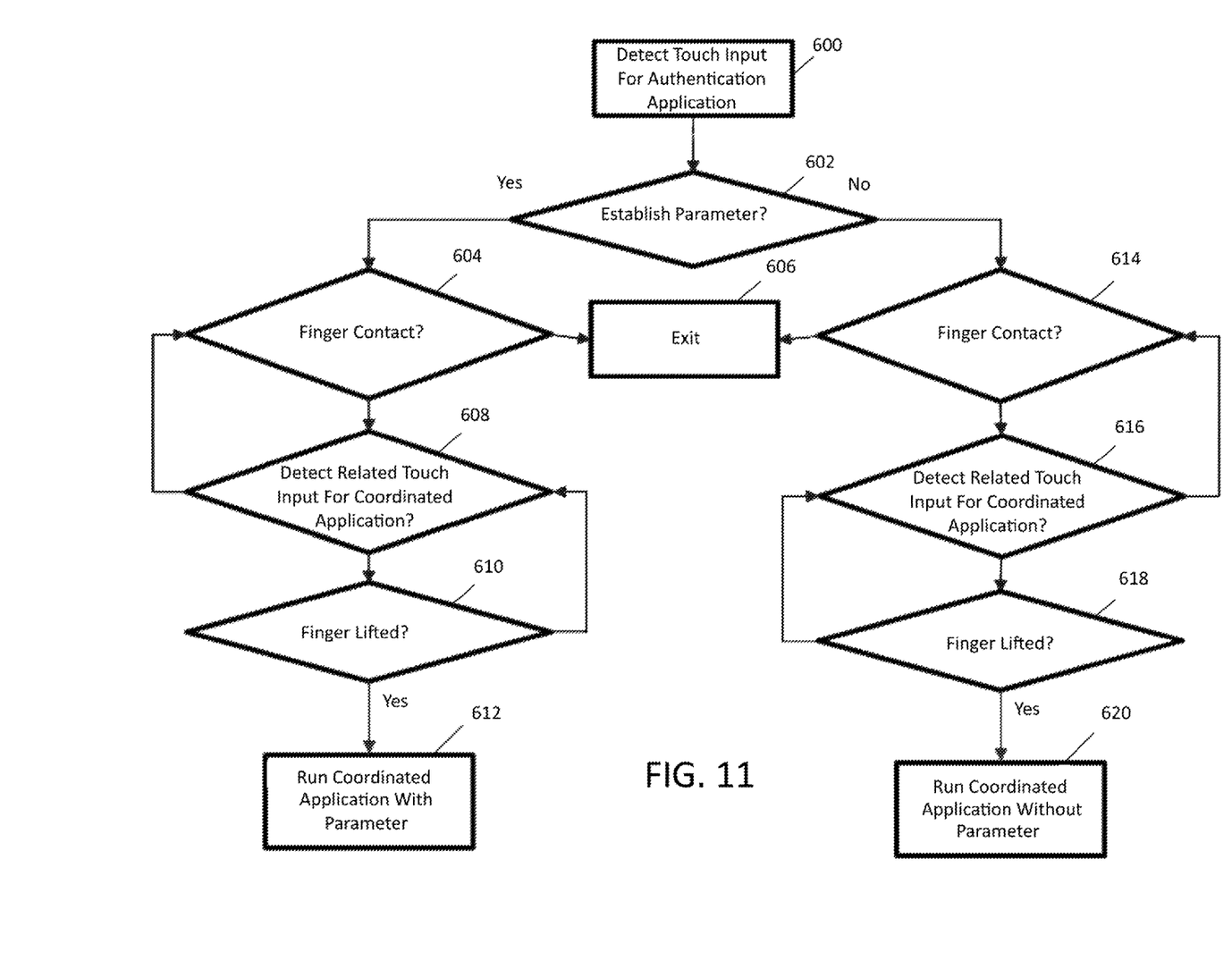
FIG. 11 is a flowchart showing a routine for coordinating applications by providing a touch input at an authentication application device location according to an embodiment.

Similarly, FIG. 11 schematically depicts an illustrative routine that may be performed when the first application is authentication application 118. Beginning with 600, a touch input may be detected at a device location associated with a first application, which as noted is authentication application 118 in this example. Operation of authentication application 118 determines whether the at least one parameter is established, such as when an appropriate fingerprint match is confirmed. As indicated, the routine branches depending on this criterion. If the authentication parameter is established, it progresses to 604 and coordinator 116 may determine whether the user's finger has maintained continuous contact with touch screen 122. If not, such as if the finger is lifted before providing the related touch input, the routine may exit at 606. Otherwise, at 608 it may be determined whether a related touch input has been detected at a device location associated with a second application, here coordinated application 108. As indicated, monitoring for related touch input may continue while the user's finger remains in contact with touch screen, by looping back to 604 to confirm finger contact when the related touch input has not yet been detected. Once the related touch input is detected, the routine continues to 610 to check for completion of the gesture. If the user lifts the finger off touch screen 122 at the device location associated with coordinated application 108, it may be run with the established parameter as indicated in 612. Otherwise, the routine loops back to 608 to ensure the related touch input is still being detected. Returning to 602, if the authentication parameter was not established, such as if the user's identity was not verified, the operations indicated in 614, 616 and 618 may be performed, which are analogous to their respective counterparts, 604, 608 and 610, with the result of running of coordinated application 108 without the established parameter. In both cases, at the start of coordinated application 108, the application may indicate to the user if the authentication at step 600 was successful.

As desired, operation of coordinator 116 may be tailored to enhance efficiencies of computing resources, power usage or others pursuant to the techniques of this disclosure. For example, in the context of embodiments in which the second application is authentication application 118, maintaining fingerprint sensor 128 in an active state capable of detecting characteristics of a user's fingerprint may require computation cycles and/or consume energy. Thus, it may be desirable reduce the amount of time fingerprint sensor 128 is in the active state by employing coordinator 116 to selectively enable one or more aspects of fingerprint sensor 128 based at least in part on an anticipated need to establish the authentication parameter. In some embodiments, detecting the touch input of the user at the device location associated with coordinated application 108 may provide the indication for coordinator 116 to selectively activate fingerprint sensor

128. A further check may be performed before activation in some embodiments. For example, the related touch input at the device location for authentication application 118, such as fingerprint sensor 128, may be end of a swipe or other suitable gesture as discussed above. Correspondingly, coordinator 116 may await detection of a user input pattern consistent with the swipe or gesture before activating fingerprint sensor 128. As an illustration in the context of FIGS. 3 and 4, the swipe may begin at location 300 and be directed towards fingerprint sensor 128. By calculating a vector for the initial movement of the user's finger from location 300, it may be determined whether the user motion is "aiming" for the fingerprint sensor 122. If not, coordinator 116 may be configured to forego activating fingerprint sensor 122. As will be appreciated, a given period of time may be required to activate fingerprint sensor 122. Based upon average input times, it may be determined when fingerprint sensor 122 should be activated so that the user input pattern being detected occurs sufficiently early during the swipe gesture to allow completion of the activation at least by the time the user's finger is expected to arrive. Activation may involve a software component, such as launching, waking or otherwise operating authentication application 118, and/or may involve a hardware component, such as powering on fingerprint sensor 128, performing a calibration routine, or others.

In light of the above materials, it will be appreciated the user authentication application may employ a fingerprint detector. One of the device locations associated with the first and second applications may function as a fingerprint sensor. Each of the device locations associated with the first and second applications may be on a single device surface. Further, each of the device locations associated with the first and second applications may be on a single display screen. The device location configured to sense fingerprints may be variable. The related touch input ending at the device location associated with the second application may be a swipe that continues from the detected touch input at the device location associated with the first application.

In one aspect, the first application may be the user authentication application. The parameter established by the user authentication application may be a user verification if the fingerprint sensor detects a matching fingerprint and if the related touch input is continuously completed.

In one aspect, the second application may be the user authentication application. The at least one parameter may be based at least in part on a request from the first application. The user authentication application may be operated based at least in part on the detection of touch input at the device location associated with the first application. Operating the user authentication application may also be based on detection of a user input pattern that matches a beginning of the related touch input. Operating the user authentication application may involve activating at least one hardware component. Activating the at least one hardware component may include calibrating the fingerprint sensor. Activating the at least one hardware component may also include adjusting operation of the fingerprint sensor, such as adjusting operation of the fingerprint sensor based on the related touch input.

In one aspect, each of the device locations associated with the first and second applications are on opposing device surfaces. The related touch input may be a touch input that occurs at a same time as the detected touch input.

In one aspect, the user authentication application may recognize a user input to verify identification.

In one aspect, the method may include a visual indication of the coordination between the first and second applications. The visual indication may signal the device locations associated with the first and second applications.

In one aspect, at least one of the device locations associated with the first and second applications may be based on the position of the fingerprint sensor.

In one aspect, a visual indication may be provided when the touch input is detected at the device location associated with the first application. This may involve providing a visual indication at the device location associated with the second application. As desired, providing a visual indication when the touch input is detected at the device location associated with the first application may include providing a visual indication on an external display.

As noted above, embodiments of the disclosure may include a device for coordinating at least two applications. In such a device, the fingerprint sensor may be mounted adjacent to the touch screen of the device, may be mounted behind the touch screen of the device or may be integrated with the touch screen of the device.

In one aspect, the authentication application selects the fingerprint sensor based on one of the first and second application.

In one aspect, operation of the fingerprint sensor may be based at least in part on one of the first application and detection of the touch input at the device location associated with the first application.

This disclosure may also include a non-transitory processor-readable storage medium for coordinating applications, the processor-readable storage medium having instructions thereon. The instructions may include code for detecting a touch input at a device location associated with a first application, monitoring for a related touch input ending at a device location associated with the second application, wherein one of the first and second applications is a user authentication application, detecting the related touch input at the device location associated with the second application, establishing at least one parameter with the user authentication application and running one of the first and second applications that is not the user authentication application with the at least one parameter.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for coordinating at least two applications, comprising:
providing a device having a display and a fingerprint sensor behind the display;
detecting a touch input at a device location associated with a first application;
monitoring for a related touch input ending at a device location associated with a user authentication application;
detecting the related touch input at the device location associated with the user authentication application;
establishing at least one parameter with the user authentication application, wherein the at least one parameter established by the user authentication application is a user verification only when continuous contact is maintained between the touch input and the related touch input, such that the continuous contact comprises touch input from a single user finger beginning at the device location associated with the first application and swiping to the device location associated with the user authentication application and corresponds to the fingerprint sensor and each of the device locations associated with the first application the user authentication are on the display;

running the first application with the at least one parameter; and operating the user authentication application based at least in part on the detection of the touch input at the device location associated with the first application.

2. The method of claim 1, wherein the user authentication application comprises a fingerprint detector.

3. The method of claim 2, wherein at least one of the device locations associated with the first application and the user authentication application is determined based on the position of the fingerprint sensor.

4. The method of claim 1, wherein the device location configured to sense fingerprints is variable.

5. The method of claim 1, wherein the at least one parameter is based at least in part on a request from the first application.

6. The method of claim 1, wherein operating the user authentication application is also based on detection of a user input pattern that matches a beginning of the related touch input.

7. The method of claim 1, wherein operating the user authentication application comprises activating at least one hardware component.

8. The method of claim 7, wherein activating at least one hardware component comprises calibrating the fingerprint sensor.

9. The method of claim 7, wherein activating at least one hardware component comprises adjusting operation of the fingerprint sensor.

10. The method of claim 9, wherein adjusting operation of the fingerprint sensor is based on the related touch input.

11. The method of claim 1, wherein the user authentication application is configured to recognize a user input to verify identification.

12. The method of claim 1, further comprising a visual indication of the coordination between the first application and user authentication application.

13. The method of claim 12, wherein the visual indication signals the device locations associated with the first application and the user authentication application.

14. The method of claim 1, further comprising providing a visual indication when the touch input is detected at the device location associated with the first application.

15. The method of claim 14, wherein providing a visual indication when the touch input is detected at the device location associated with the first application comprises providing a visual indication at the device location associated with the user authentication application.

16. The method of claim 14, wherein providing a visual indication when the touch input is detected at the device location associated with the first application comprises providing a visual indication on a remote display.

17. A user interface for a device having a touch-based input, wherein the interface comprises a display and a fingerprint sensor behind the display and is configured to:

detect a touch input at a device location associated with a first application;

monitor for a related touch input ending at a device location associated with a user authentication application;

detect the related touch input at the device location associated with the user authentication application;

establish at least one parameter with the user authentication application, wherein the at least one parameter established by the user authentication application is a user verification only when continuous contact is maintained between the touch input and the related touch input, such that the continuous contact comprises touch input from a single user finger beginning at the device location associated with the first application and swiping to the device location associated with the user authentication application and corresponds to the fingerprint sensor and each of the device locations associated with the first application and the user authentication application are on the display;

run the first application with the at least one parameter; and operate the user authentication application based at least in part on the detection of the touch input at the device location associated with the first application.

18. A device for coordinating at least two applications, comprising:

a touch screen display;

a fingerprint sensor behind the display; and a processor operable to:

detect a touch input at a device location associated with a first application;

monitor for a related touch input ending at a device location associated with a second application, wherein one of the first and second applications is a user authentication application;

detect the related touch input at the device location associated with the second application;

establish at least one parameter with the user authentication application, wherein the at least one parameter established by the user authentication application is a user verification only when continuous contact is maintained between the touch input and the related touch input, such that the continuous contact comprises touch input from a single user finger beginning at the device location associated with the first application and swiping to the device location associated with the second application, wherein one of the device locations associated with the first and second applications corresponds to the fingerprint sensor, wherein operation of the fingerprint sensor is based at least in part on one of the first application and detection of the touch input at the device location associated with the first application and wherein each of the device locations associated with the first and second applications are on the display; and run one of the first and second applications that is not the user authentication application with the at least one parameter.

* * * * *